United States Patent

[11] 3,545,453

| [72] | Inventor | Stewart Hoffman<br>144—24 72nd Ave., Flushing, New York 11367 |
|---|---|---|
| [21] | Appl. No. | 777,950 |
| [22] | Filed | Oct. 11, 1968 |
| [45] | Patented | Dec. 8, 1970 |

[54] PROCESS FOR PRESERVING CIGARS AND TOBACCO
1 Claim, 8 Drawing Figs.

[52] U.S. Cl. .................................................. 131/25,
 131/12, 131/92, 131/133, 131/144
[51] Int. Cl. ..................................................... A24b 09/00,
 A24b 15/04
[50] Field of Search .......................................... 131/25, 92,
 79, 144, 12, 13, 17

[56] References Cited
UNITED STATES PATENTS

| 996,830 | 7/1911 | Bercy | 131/144 |
| 1,219,856 | 3/1917 | Parker | 131/144X |
| 1,961,866 | 6/1934 | Rooker | 131/144X |
| 2,130,729 | 9/1938 | Burns | 131/25X |
| 2,584,060 | 1/1952 | Stephano | 131/25UX |
| 3,112,754 | 12/1963 | Diaz | 131/2 |

FOREIGN PATENTS

| 632,490 | 7/1936 | Germany | 131/12 |
| 298,151 | 1/1929 | Great Britain | 131/144 |

OTHER REFERENCES

Triest, "Flavors—What Do They Do For Tobacco?." 7-1968. Tobacco. Vol. 167, No. 4, July 26, 1968. p. 139.

Primary Examiner—Samuel Koren
Assistant Examiner—James H. Czerwonky
Attorney—Jacob L. Kollin ABSTRACT: A process for preserving cigars. The process employs a heated mixture of equal parts by weight of orange juice, pineapple juice and honey. While heated at a temperature between 100° F. and 150° F. the mixture is injected into the cigars before they are cellophane wrapped and sealed. The process may also be used for preserving tobacco.

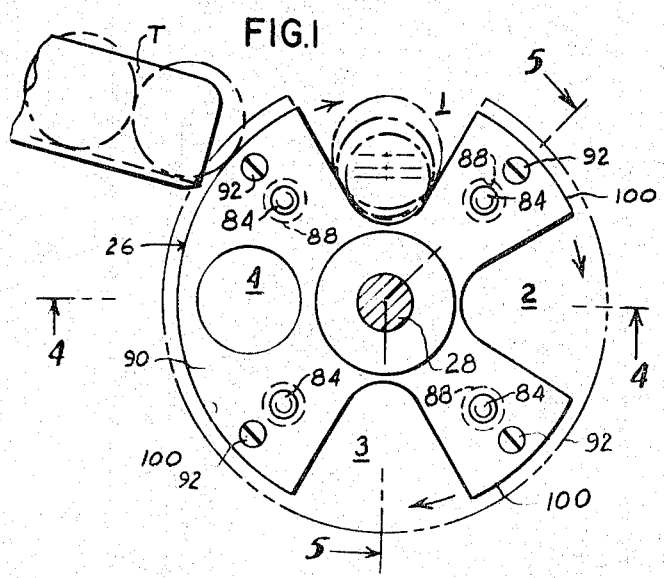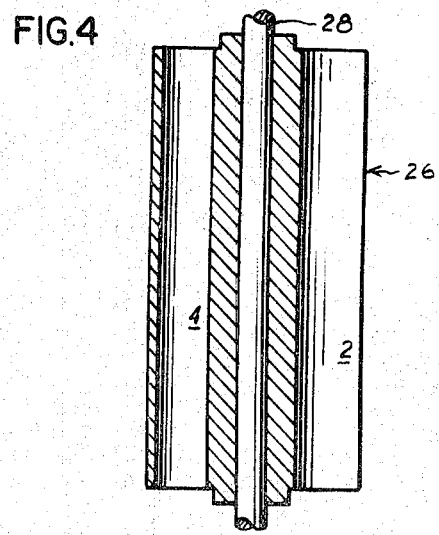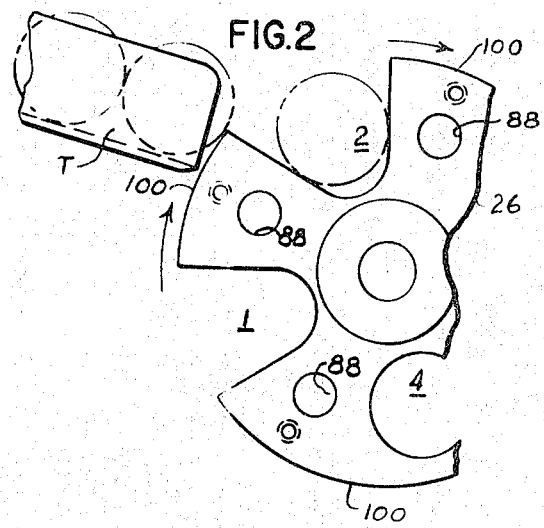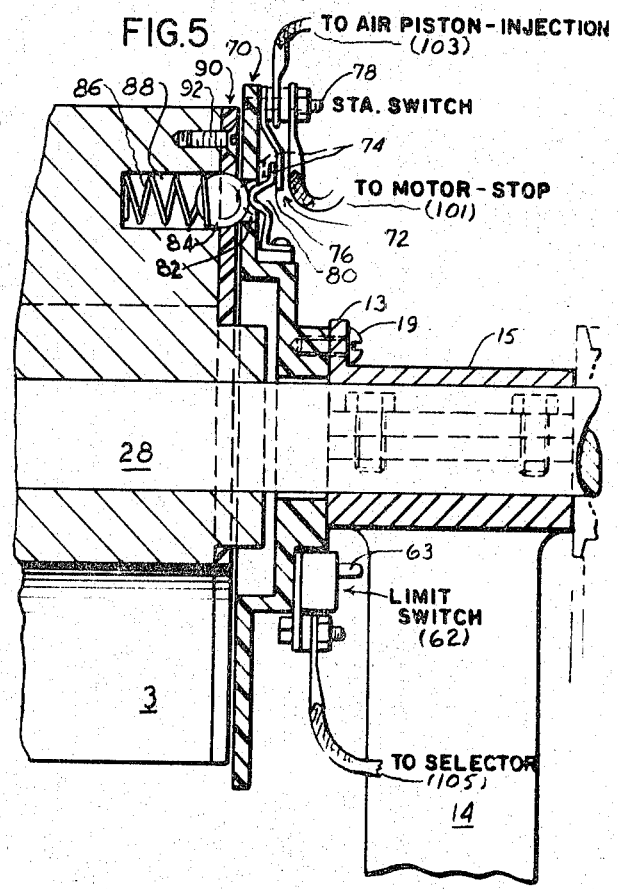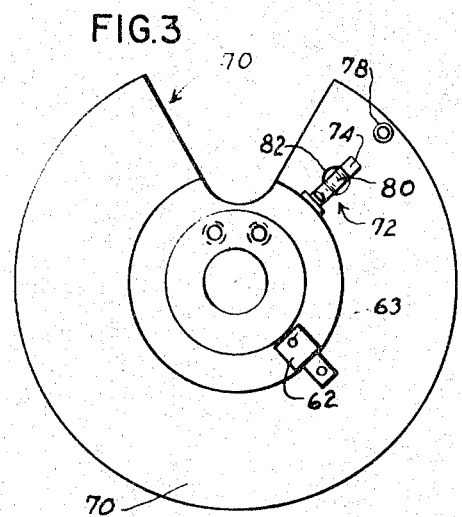

INVENTOR.
STEWART HOFFMAN
BY
Jacob L. Kollin
ATTORNEY

PROCESS FOR PRESERVING CIGARS AND TOBACCO

BACKGROUND OF THE INVENTION

The invention relates to a process for preserving cigars and to a device for practicing said process.

The cigar industry suffers substantial losses yearly, due to the fact that a great number of cigars are returned to the cigar manufacturers as unfit for sale. This is caused by the difficulty of preserving the cigars under existing conditions of storage and distribution. As a consequence, when such cigars have reached the consumer, they are dried out, brittle, stale and devoid of the proper aroma.

The object of the present invention is to remedy the above shortcomings by providing a process for preserving the freshness and aroma of the cigars from the time they are initially manufactured until they reach the individual consumer.

THE PROCESS

In accordance with the invention, newly manufactured cigars are injected on each end with a preserving solution before they are cellophane wrapped. The solution consists of orange juice, pineapple juice and honey. Other fruit juices, such as apple, blackberry, grape, etc., in combination with honey may be used. However, the mixture of orange and pineapple juice with honey, as per the following example, is the most effective.

EXAMPLE 32 ounces, by weight, of orange juice are mixed with 32 ounces, by weight, of pineapple juice and 32 ounces, by weight, of honey. The mixture is stirred in a suitable container, while being heated at a temperature sufficient to form a thorough mixture. The temperature may be in the range of 100° F. to 150° F. Each of the cigars to be preserved is injected at both ends with 30 mg. of the mixture. If the mixture has been cooled while storing, it should be stirred and reheated before injecting. The cigar is then cellophane wrapped.

It had been found that the cigars treated in the above manner have preserved their freshness, softness and aroma for many months, without requiring humidors or other special conditions of storage.

THE DEVICE FOR PRACTICING THE PROCESS

The accompanying drawing illustrates an embodiment of the device for practicing the process of the invention.

It is to be understood, however, that various changes in the detail construction, size and shape thereof may be made within the scope of the inventive concept.

IN THE DRAWING

FIG. 1 is a side view of the cylinder employed in the device;
FIG. 2 is a partial view of the cylinder in another position;
FIG. 3 shows the switch plate of the device;
FIG. 4 is a section taken on line 4—4 of FIG. 1;
FIG. 5 is a section taken on line 5—5 of FIG. 1;
FIG. 6 is a front elevational view of the device;
FIG. 7 is an end elevation of the device, and
FIG. 8 is a schematic representation of the circuit employed in the device.

Referring now to the drawing in detail, frame 10 is provided with slit-bearing supports 12 and 14 and a slotted angle support 16 having slots 17 and 18. Mounted on base plate 20 is a motor 22 with an on-and-off switch 23 and a solution or water selector switch 24. A fluted cylinder 26 having a shaft 28 is mounted in the split bearing supports 12 and 14. Mounted on shaft 28 is a pulley 30 driven by motor 22 through belt 32 and pulley 34 mounted on the motor shaft.

Mounted on each of the cylinder angle supports 16 at slot 18, by means of studs 36 and secured by nuts 38, is a power cylinder 40. Mounted in the same manner on the opposite side of the fluted cylinder 26 is a similar air cylinder (not shown).

The power cylinder 40 is air operated by an electrically operated two-way valve 42 from a compressed air supply (not shown) connected to the valve 42 through line 46, and lines 48 and 50 connected to air cylinder 40 having a piston head 41 and a piston rod 43 provided with an axial bore 45 terminating in cross bores 47, just short of the piston head 41.

Communicating with the forward part of the cylinder and mounted on each side thereof are a water valve 52 and solution valve 54.

Detachably secured to the free end of the piston rod 43 is an hypodermic needle 56.

Secured to the piston rod 43 is a switch-actuating plate 58.

Mounted on cylinder 40 is a retract limit switch 60 having a pin 61. Similarly mounted on switch plate 70 is an injection limit switch 62 having a pin 63. Switch plate 70 is mounted on flange 13 of split bearing 15 by means of screws 19. Also mounted on switch plate 70 is a station switch generally indicated as 72. The station switch 72 comprises a flexible spring contact 74 and a rigid contact 76. Aligned with ridge 80 of flexible contact 74 is a hole 82 in the switch plate 70 in which can be partly seated balls 84 when aligned with said hole, said balls being under compression by spring 86, received in hole 88 of fluted cylinder 26. The ball and spring are retained by plate 90 which is secured to fluted cylinder 26 by screws 92.

The fluted cylinder 26 is formed with flutes 1, 2 and 3 and a longitudinal bore 4. Said flutes are adapted to receive the cigars to be injected with the preservative mixture. As shown in FIG. 1, the cigars may be in sets of different diameters. To compensate for variation in these diameters, adjustment is made at the rear of cylinder 40 by raising or lowering it in slot 18, while loosening nuts 38. Similarly, various lengths of cigars can be accommodated by moving and adjusting angle support 16 or cylinder 26 at slot 17.

When the injection device is thus connected, it will start operation simultaneously with the banding and cellophane-wrapping machine.

The cigars are fed consecutively from trough T, as indicated in FIGS. 1 and 2, a cigar being received in a flute when the latter is aligned with the trough. However, when any of the flutes are not in alignment with the end of trough T, the peripheral portions 100 of the fluted cylinder 26 prevent the cigars from leaving trough T. Although only three flutes are shown in the present embodiment, the invention is not limited to this number and additional flutes can be provided in the cylinder if desired. Indicated by the numeral 4 is a longitudinal bore which is provided to permit a periodical flushing with water of the hypodermic syringe 56, the needle the cylinder and the bores in the piston rod.

OPERATION OF THE DEVICE

The device is initially mounted on the cigar machine table just ahead of the cellophane-wrapping station.

The operation is started by turning on motor 22 by means of switch 23 which may be connected in parallel with the main switch of the banding and cellophane-wrapping machine.

When the injection device is thus connected, it will start operation simultaneously with the banding and cellophane-wrapping machine.

Fluted cylinder 26 will move in clockwise direction until ball 84 seats itself in hole 82, thereby moving spring 74 into contact with spring 76, thus closing the circuit and stopping the motor through electrical conduit 101 a relay of known construction (not shown), and stopping the rotation of the fluted cylinder 26. At the same time the electrically-operated valve 42, actuated through electrical line 103, directs compressed air into line 50, moving piston head 41 and piston rod 43 forward, thus forcing fluid into bores 47 and through bore 45 into the hypodermic needle 56 and ejecting the fluid mixture into the cigar during its forward thrust. At the end of the needle's forward movement, plate 58 contacts pin 63 of limit switch 62, relaying a signal through electrical line 105 to the water or solution selector switch preset manually for sequential operation. Simultaneously, limit switch 62 relays a signal over electrical line 107 to the electrically operated valve 42, opening the valve to air line 48 thus retracting piston head 41. Through preset selector switch 24 signals are transmitted, in known manner, through electrical line 109 to water valve 52 through electrical line 111 to solution valve 54. As piston rod 43 retracts, plate 58 pushes pin 61 which signals, through electrical line 113, to switch 23 to start motor 22. The sequence is repeated as described above.

I claim:
1. Process for preserving cigars and preventing them from drying out, comprising injecting cigars with a mixture of equal parts by weight of orange juice, pineapple juice and honey, said mixture being stirred, while heated at a temperature of from 100° F. to 150° F., said mixture being injected in heated condition into cigars and subsequently sealing the cigars with a cellophane wrapper.